United States Patent
Chang et al.

(10) Patent No.: US 11,018,925 B1
(45) Date of Patent: May 25, 2021

(54) METHOD AND APPARATUS FOR USE IN POLAR TRANSMITTER TO PERFORM NONLINEAR DISTORTION ESTIMATION AND COMPENSATION

(71) Applicant: Realtek Semiconductor Corp., HsinChu (TW)

(72) Inventors: Yuan-Shuo Chang, HsinChu (TW); Yi-Chang Shih, HsinChu (TW); Chih-Wei Lai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/920,373

(22) Filed: Jul. 2, 2020

(30) Foreign Application Priority Data

Mar. 23, 2020 (TW) .................................. 109109624

(51) Int. Cl.
*H04K 1/02* (2006.01)
*H04L 27/36* (2006.01)
*H04B 1/04* (2006.01)

(52) U.S. Cl.
CPC ......... *H04L 27/366* (2013.01); *H04B 1/0475* (2013.01); *H04B 2001/0408* (2013.01)

(58) Field of Classification Search
CPC ................ H04L 27/366; H04B 1/0475; H04B 2001/0408

USPC ......................... 375/297, 296, 295, 219, 316
See application file for complete search history.

(56) References Cited

U.S. PATENT DOCUMENTS

2016/0142230 A1* 5/2016 Eliezer ................. H04B 1/0475
 375/238
2019/0036749 A1* 1/2019 Erez ..................... H04L 27/2602

OTHER PUBLICATIONS

Waheed, "Adaptive Digital Linearization of a DRP based EDGE Transmitter for Cellular Handsets", 2007.
Bashir, "Autonomous Predistortion Calibration of an RF Power Amplifier", 2011.

* cited by examiner

*Primary Examiner* — Zewdu A Kassa
(74) *Attorney, Agent, or Firm* — Winston Hsu

(57) ABSTRACT

An apparatus for use in a polar transmitter to perform distortion estimation and compensation is provided. The apparatus includes a mixing unit, a signal processing unit, an estimation unit and a compensation unit. The mixing unit is configured to mix a test output signal and a frequency down-converting signal to generate a mixed signal. The processing unit is configured to perform signal processing on the mixed signal to generate a processed signal. The estimation unit is configured to perform distortion estimation on the processed signal to generate a distortion estimation result. The compensation unit is configured to perform pre-distortion compensation on input signals of the polar transmitter according to the distortion estimation result.

10 Claims, 3 Drawing Sheets

METHOD AND APPARATUS FOR USE IN POLAR TRANSMITTER TO PERFORM NONLINEAR DISTORTION ESTIMATION AND COMPENSATION

BACKGROUND OF THE INVENTION

1. Field of the Invention

The present invention relates to polar modulation communication system, and more particularly, to a method and apparatus for performing nonlinear distortion estimation and compensation in a polar transmitter.

2. Description of the Prior Art

In a polar (modulation) transmitter, in-phase (I)/quadrature (Q) signals on I/Q channels are converted into amplitude and phase signals. These two signals are combined and transmitted through a power amplifier. The polar transmitter is favorable since it can be implemented using all digital circuits, which is advantageous over transmitters implemented using analog circuits in certain ways. However, the power amplifier can generate nonlinear distortion, which may lead to the degradation of communication quality. FIG. 1 shows nonlinear distortion caused by a power amplifier in a polar transmitter, including amplitude modulation to amplitude modulation (AM-AM) distortion and amplitude modulation to phase modulation (AM-PM) distortion. As shown in the figure, when the amplitude of the input signal is higher than a certain level, the relationship between the output amplitude and the input amplitude is not linear anymore. Similarly, the output phase will be distorted after the amplitude of the input signal is higher than a certain level. Such distortions can be attributed to the poor nonlinearity characteristics of the power amplifier. In order to improve the communication quality, it is necessary to develop a distortion estimation and compensation mechanism to address the abovementioned problem.

SUMMARY OF THE INVENTION

In order to solve the nonlinear distortion problem of the power amplifier being used in the conventional polar transmitter, the present invention provides a distortion estimation and compensation apparatus and method. In the nonlinear distortion estimation architecture provided by the present invention, the frequency down-conversion technique is employed to make it easier to observe the output signal of the power amplifier. Then, through a series of signal processing techniques, the amplitude modulation to amplitude modulation distortion and the amplitude modulation to phase modulation distortion of the power amplifier can be estimated. Subsequently, pre-distortion compensation is performed on input signals of the polar transmitter based on distortion estimation result, thereby overcoming the nonlinear deficiency of the power amplifier.

According to one embodiment, an apparatus for use in a polar transmitter to perform distortion estimation and compensation is provided. The apparatus comprises: a mixing unit, a signal processing unit, an estimation unit and a compensation unit. The mixing unit is configured to mix a test output signal of the polar transmitter and a frequency down-converting signal to generate a mixed signal. The signal processing unit is coupled to the mixing unit and configured to perform a signal processing operation on the mixed signal to generate a processed signal. The estimation unit is coupled to the signal processing unit and configured to perform distortion estimation on the processed signal to generate a distortion estimation result. The compensation unit is coupled to the estimation unit and an input end of the polar transmitter and configured to perform pre-distortion compensation on input signals of the polar transmitter according to the distortion estimation result.

According to one embodiment, a method for use in a polar transmitter to perform distortion estimation and compensation is provided. The method comprises: mixing a test output signal of the polar transmitter and a frequency down-converting signal to generate a mixed signal; performing a signal processing on the mixed signal to generate a processed signal; performing distortion estimation on the processed signal to generate a distortion estimation result; and performing pre-distortion compensation on input signals of the polar transmitter according to the distortion estimation result.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that some specific details need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 2:
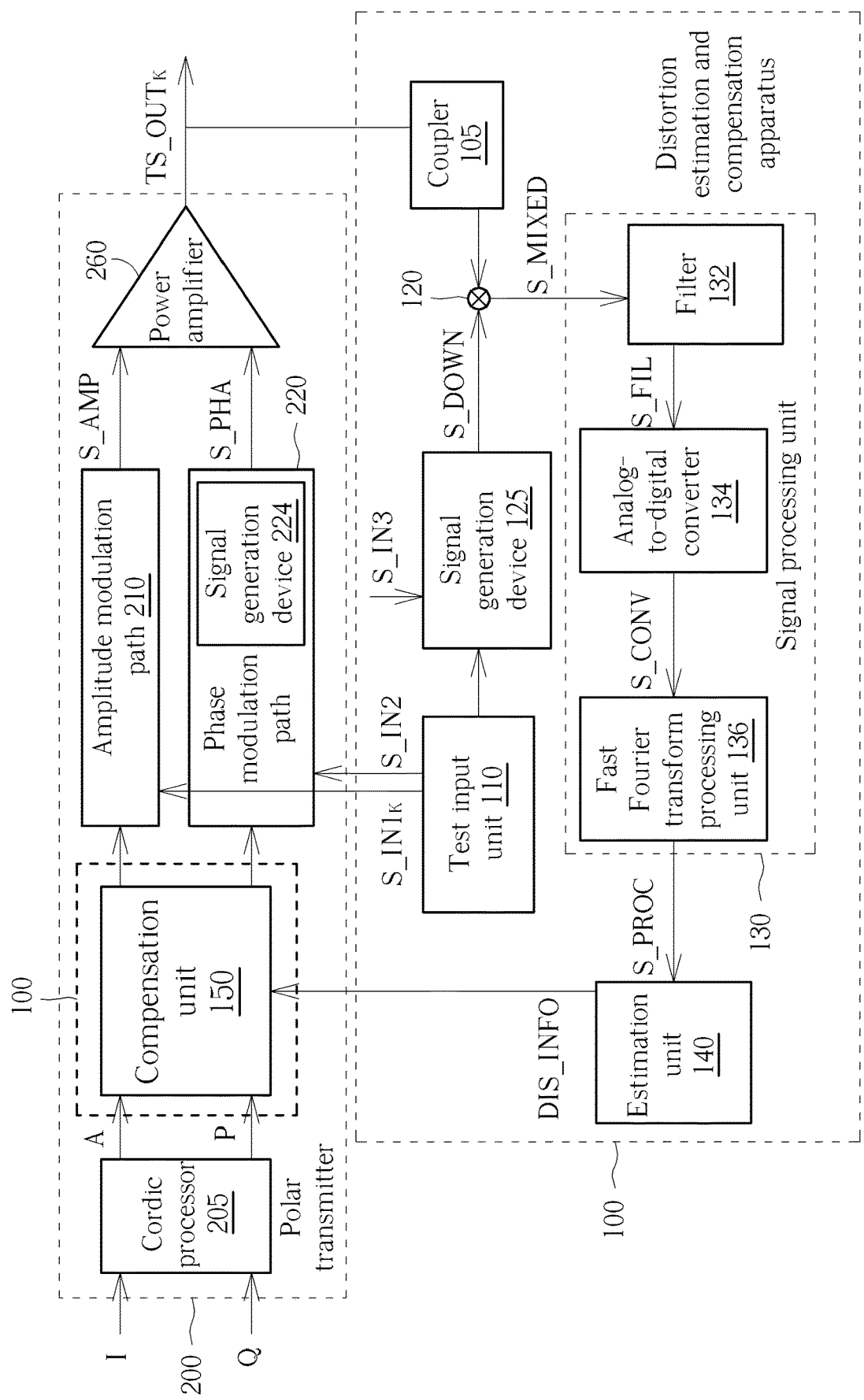
FIG. 2 illustrates structure and application of a distortion estimation and compensation apparatus according to one embodiment of the present invention.

FIG. 2 illustrates structure and application of a distortion estimation and compensation apparatus according to one embodiment of the present invention. As illustrated, the distortion estimation and compensation apparatus 100 of the present invention is configured to estimate and compensate nonlinear distortion of a polar transmitter 200. The polar transmitter 200 comprises a coordinate rotation digital computer (abbr., Cordic) processor 205, an amplitude modulation path 210, a phase modulation path 220 and a power amplifier 260. The polar transmitter 200 is configured to perform polar modulation and signal transmission according to a set of input in-phase (I)/quadrature (Q) signals. Please note that the amplitude modulation path 210 and the phase modulation path 220 of the polar transmitter 200 can comprise alternative polar modulation components or devices. However, these components or devices will be omitted in the following descriptions for the sake of brevity. The Cordic processor 205 is configured to convert I/Q signals into a set of corresponding polar-coordinate signals A/P. The polar-coordinate signals A/P can be sent to the amplitude modulation path 210 and the phase modulation path 220, respectively. By being processed through the amplitude modulation path 210 and the phase modulation path, the polar-coordinate signals A/P can be sent to the power amplifier 260 eventually. The power amplifier 260 combines the signals on the amplitude modulation path 210 and the signal on the phase modulation path 220, thereby producing "polar-modulated" signals.

The distortion estimation and compensation apparatus 100 of the present invention includes (but not limited to): a coupler 105, a test input unit 110, a mixing unit 120, a signal processing unit 130, an estimation unit 140 and a compensation unit 150. The coupler 105 can be an attenuation capacitor with variable capacitance, which is used to appropriately attenuate signals that are outputted by the power amplifier 260 and couple the attenuated signals to the distortion estimation and compensation apparatus 100. In some embodiments, the coupler 105 can be omitted. The test input unit 110 is configured to provide test input signals to the polar transmitter 200, such that the polar transmitter 200 generates a test output signal TS_OUT. The test input unit 110 provides a digital test input signal $S\_IN1_K$ to the amplitude modulation path 210 of the polar transmitter 200, which allows the amplitude modulation path 210 to output an amplitude signal S_AMP. In addition, the test input unit 110 also provides a fixed test input signal S_IN2 to the phase modulation path 220 of the polar transmitter 200. A signal generation device 224 (which can be a phase-locked loop in one embodiment) on the phase modulation path 220 generates an oscillation signal S_PHA with frequency f1 accordingly. The signal S_AMP on the amplitude modulation path 210 and the signal S_PHA on the phase modulation path 220 can cause the power amplifier 260 to generate the test output signal $TS\_OUT_K$, where the test output signal $TS\_OUT_K$ can be represented as: $A_K \cos(2\pi f1 t + \theta_K)$.

The index K represents a sequence number of performing distortion estimation. The present invention observes the test output signal $TS\_OUT_K$ generated by the power amplifier 260 when inputting different test input signals $S\_IN1_K$, thereby estimating the nonlinear characteristics of the power amplifier 260, where $A_K$ is the amplitude of the signal outputted by the power amplifier 260 in response to the input signal S_AMP and K is the phase of the signal outputted by the power amplifier 260 in response to the input signal S_AMP and S_PHA.

The mixing unit 120 is configured to mix the test output signal $TS\_OUT_K$ and a frequency down-converting signal S_DOWN to generate a mixed signal S_MIXED, where the frequency down-converting signal S_DOWN can be generated by a signal generation device 125 (which can be a phase-locked loop in one embodiment). The signal generation device 125 is controlled by a control signal S_IN3 to generate the frequency down-converting signal S_DOWN whose frequency is substantially fixed at f2, where the frequency down-converting signal S_DOWN can be represented as $B \cos(2\pi f2 t + \varphi)$. As a consequence, the mixed signal S_MIXED obtained by frequency mixing will comprise a signal component at frequency (f1+f2) and a signal component at frequency (f1−f2). In addition, the signal processing unit 130 is configured to perform a series of signal processing operations on the mixed signal S_MIXED to generate a processed signal S_PROC. The signal processing unit 130 includes (but not limited to): a filter 132, an analog-to-digital converter 134 and a fast Fourier transform unit 136. The filter 132 is configured to perform a filtering operation on the mixed signal S_MIXED to generate a filtered signal S_FIL, where the filter 132 can be a low-pass filter. Therefore, the signal components with higher frequencies in the mixed signal S_MIXED will be filtered out by the filter 132. For example, the filter 132 will remove the high-frequency signal component at frequency (f1+f2), while retaining the low-frequency signal component at frequency (f1−f2). Thus, the filtered signal S_FIL can be represented as:

$BA_K \cos(2\pi(f1-f2)t + \theta_K - \varphi)$

The analog-to-digital converter 134 is configured to perform an analog-to-digital conversion on the filtered signal S_FIL to generate a converted signal S_CONV. The fast Fourier transform processing unit 136 is configured to perform a fast Fourier transform on the converted signal S_CONV to generate the processed signal S_PROC, where The fast Fourier transform processing unit 136 extracts information including the amplitude value $M_K$ and the phase value $P_K$ from the converted signal S_CONV. Via the processed signal S_PROC, such information can be outputted to the estimation unit 140, where the amplitude value $M_K$ is associated with the amplitude $BA_K$ of the filtered signal S_FIL, and the phase value $P_K$ is associated with the phase $(\theta_K - \varphi)$ of the filtered signal S_FIL.

Figure 1:
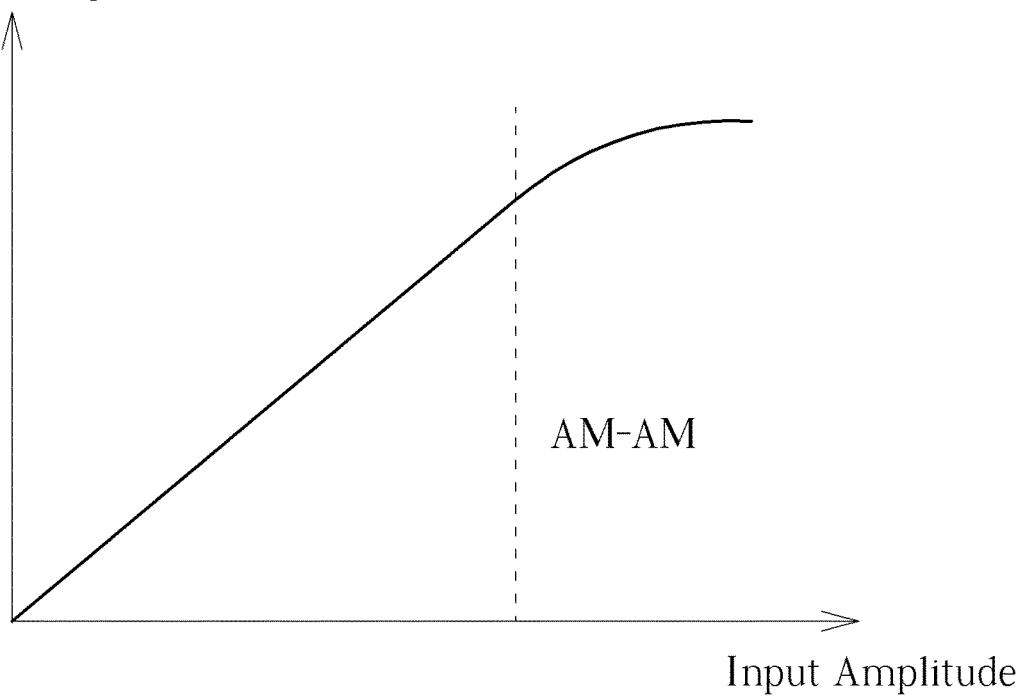
FIG. 1 illustrates nonlinear distortion of a polar transmitter.
Figure 1:
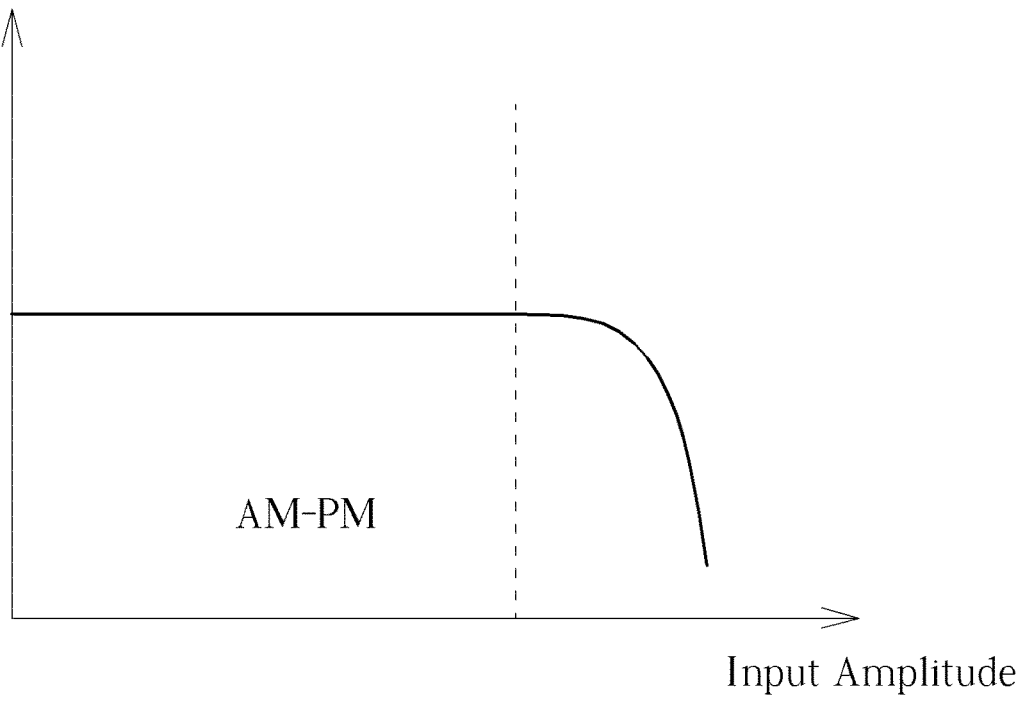

The estimation unit 140 is configured to perform distortion estimation according to the processes signal S_PROC provided by the fast Fourier transform processing unit 136, thereby generating distortion estimation result DIS_INFO. The estimation unit 140 records each amplitude value $M_K$ and each phase value $P_K$ that are obtained in response to a test input signal $S\_IN1_K$ being inputted to the polar transmitter 200. Through further analysis, the estimation unit 140 can obtain the amplitudes $A_K$ and the phases $\theta_K$ of the output signals generated by the power amplifier 260 in response to the input signals with different amplitudes. As a result, the amplitude modulation to amplitude modulation (AM-AM) distortion and the amplitude modulation to phase modulation (AM-PM) distortion of the power amplifier 260 can be estimated (as shown by FIG. 1). After the analysis, the distortion estimation result DIS_INFO can be sent to the compensation unit 150. The compensation unit 150 can perform pre-distortion compensation on input signals of the amplitude modulation path 210 and the phase modulation path 220 of the polar transmitter 200 according to the distortion estimation result DIS_INFO (based on related inverse functions), thereby canceling/alleviating the AM-AM distortion and the AM-PM distortion caused by the nonlinearity characteristics of the power amplifier 260.

Figure 3:
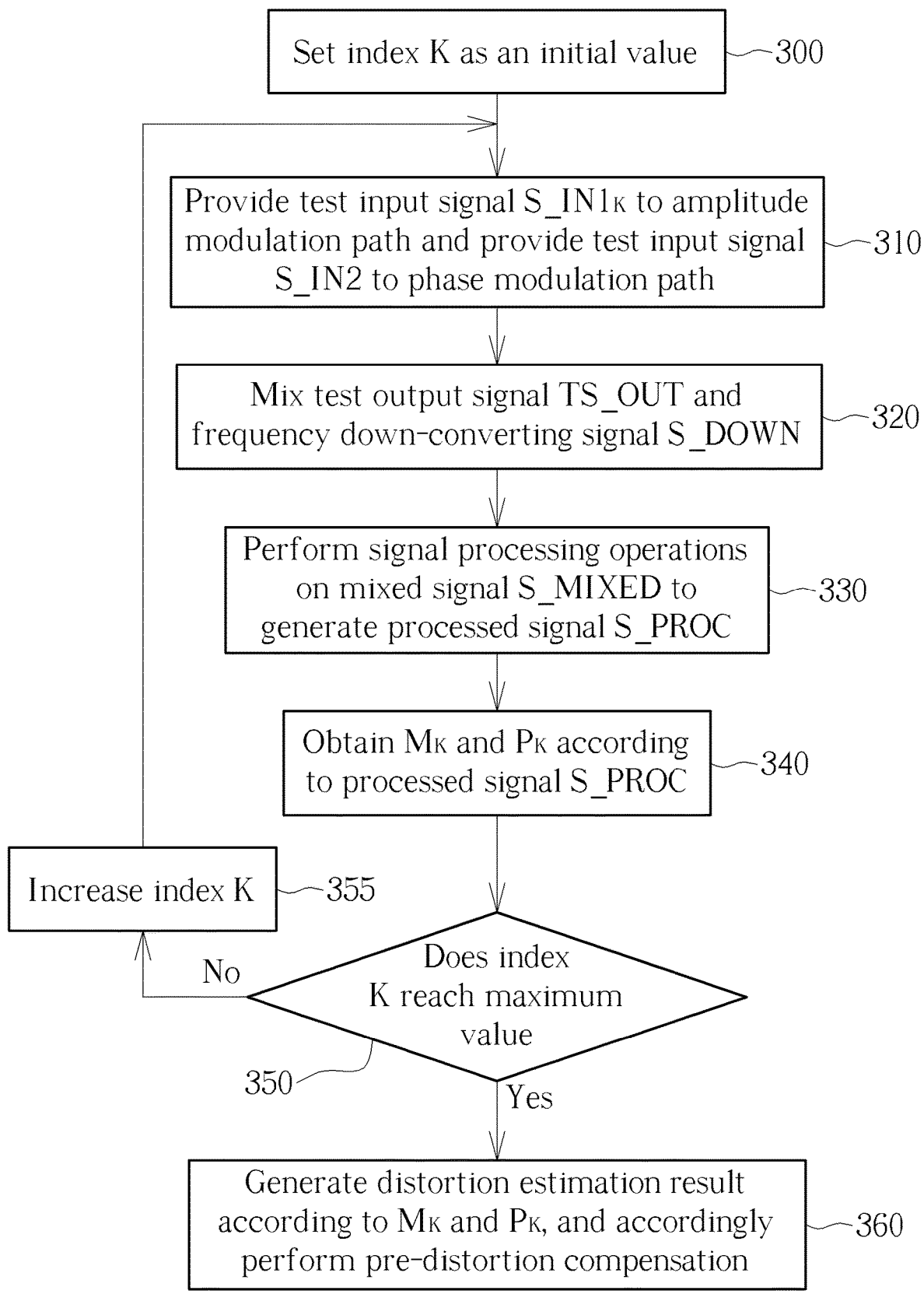
FIG. 3 illustrates a flow chart of distortion estimation and compensation method according to one embodiment of the present invention.

FIG. 3 illustrates a flow chart of distortion estimation and compensation method according to one embodiment of the present invention. First, at step 300, the index K is set as an initial value. At step 310, the test input signal $S\_IN1_K$ is determined according to the current index K. The test input signal $S\_IN1_K$ is provided to the amplitude modulation path 210 to obtain the signal S_AMP. The test input signal S_IN2 is provided to the phase modulation path 220, such that the signal generation device 224 on the phase modulation path 220 generates the signal S_PHA at frequency f1. As a consequence, the power amplifier 260 generates the test output signal TS_OUT. At step 320, mixing the test output signal TS_OUT and the frequency down-converting signal S_DOWN to obtain the mixed signal S_MIXED. At step 330, signal processing operations are performed on the mixed signal S_MIXED to generate the processed signal S_PROC. At step 340, according to the processed signal S_PROC, the amplitude value $M_K$ and the phase value $P_K$ associated with the current index K are obtained. At step 350, it is determined whether or not the current index K reaches the maximum value; if not, the flow goes to step 355, increasing the index K. Then, the flow goes back to the step 310. If it is determined that the current index K has reached the maximum value, the flow goes to step 360, generating the distortion estimation result according to the amplitude values $M_K$ and the phase values $P_K$, such that the pre-distortion compensation is accordingly performed.

In summary, the distortion estimation and compensation apparatus and method of the present invention can effectively solve the nonlinear distortion problem caused by the power amplifier in the conventional polar transmitter. In the nonlinear distortion estimation architecture of the present invention, a frequency down-conversion technique is used, such that the output signal of the power amplifier can be shifted to a frequency band that is easier to be observed. Then, through a series of signal processing techniques, the amplitude modulation to amplitude modulation distortion and the amplitude modulation to phase modulation distortion can be estimated. Based on the distortion estimation results, the polar transmitter is compensated by effective pre-distortion, so as to overcome the nonlinearity of the power amplifier.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for use in a polar transmitter to perform distortion estimation and compensation, comprising:
   a mixing unit, configured to mix a test output signal of the polar transmitter and a frequency down-converting signal to generate a mixed signal;
   a signal processing unit, coupled to the mixing unit, configured to perform a signal processing on the mixed signal to generate a processed signal;
   an estimation unit, coupled to the signal processing unit, configured to perform distortion estimation on the processed signal to generate a distortion estimation result;
   a compensation unit, coupled to the estimation unit and the polar transmitter, configured to perform pre-distortion compensation on input signals of the polar transmitter according to the distortion estimation result; and
   a test input unit, configured to provide a first test input signal and a second test input signal to the polar transmitter, wherein the first test input signal is provided to an amplitude modulation path of the polar transmitter, and the second test input signal is provided to a phase modulation path of the polar transmitter, such that a power amplifier of the polar transmitter outputs the test output signal.

2. The apparatus of claim 1, wherein the signal processing unit comprises:
   a filter, configured to filter the mixed signal to generate a filtered signal;
   a analog-to-digital converter, coupled to the filter, configured to perform an analog-to-digital conversion on the filtered signal to generate a converted signal; and
   a fast Fourier transform processing unit, coupled to the analog-to-digital converter, configured to perform a fast Fourier transform on the converted signal to generate the processed signal.

3. The apparatus of claim 1, wherein the phase modulation path comprises a first signal generation device, wherein the first signal generation device generates an oscillation signal with a first frequency according to the second test input signal.

4. The apparatus of claim 3, further comprising:
   a second signal generation device, coupled to the mixing unit, configured to generate the frequency down-converting signal with a second frequency, wherein the second frequency is different from the first frequency.

5. The apparatus of claim 1, wherein the distortion estimation result comprises indications of an amplitude modulation to amplitude modulation (AM-AM) distortion and an amplitude modulation to phase modulation (AM-PM) distortion.

6. A method for use in a polar transmitter to perform distortion estimation and compensation, comprising:
   mixing a test output signal of the polar transmitter and a frequency down-converting signal to generate a mixed signal;
   performing a signal processing on the mixed signal to generate a processed signal;

performing distortion estimation on the processed signal to generate a distortion estimation result;

performing pre-distortion compensation on input signals of the polar transmitter according to the distortion estimation result; and providing a first test input signal to an amplitude modulation path of the polar transmitter, and providing a second test input signal to a phase modulation path of the polar transmitter, such that a power amplifier of the polar transmitter outputs the test output signal.

7. The method of claim 6, wherein the step of performing the signal processing on the mixed signal comprises:

filtering the mixed signal to generate a filtered signal;

performing an analog-to-digital conversion on the filtered signal to generate a converted signal; and performing a fast Fourier transform on the converted signal to generate the processed signal.

8. The method of claim 6, wherein the step of outputting the test output signal comprises:

generating an oscillation signal with a first frequency on the phase modulation path according to the second test input signal.

9. The method of claim 8, wherein the step of mixing the test output signal and the frequency down-converting signal comprises:

generating the frequency down-converting signal with a second frequency, wherein the second frequency is different from the first frequency.

10. The method of claim 1, wherein the distortion estimation result comprises indications of an amplitude modulation to amplitude modulation (AM-AM) distortion and an amplitude modulation to phase modulation (AM-PM) distortion.

* * * * *